United States Patent [19]

Kajiwara

[11] Patent Number: 5,218,414
[45] Date of Patent: Jun. 8, 1993

[54] DISTANCE MEASURING APPARATUS UTILIZING TWO-DIMENSIONAL IMAGE

[75] Inventor: Yasuya Kajiwara, Hyogo, Japan

[73] Assignee: Mitsubishi Denki K.K., Tokyo, Japan

[21] Appl. No.: 881,861

[22] Filed: May 12, 1992

[30] Foreign Application Priority Data

May 14, 1991 [JP] Japan .................................. 3-107860

[51] Int. Cl.[5] ............................................. G01C 3/00
[52] U.S. Cl. ........................................ 356/1; 356/3; 356/4
[58] Field of Search .................................. 356/1, 4, 3

[56] References Cited

U.S. PATENT DOCUMENTS

| 4,668,084 | 5/1987 | Suzuki et al. | 356/1 |
| 4,695,156 | 9/1987 | Taft | 356/1 |
| 4,698,493 | 10/1987 | Fried . | |
| 5,023,712 | 6/1991 | Kajiwara . | |
| 5,057,681 | 10/1991 | Beder et al. | 356/1 X |

FOREIGN PATENT DOCUMENTS

| 3642196 | 6/1988 | Fed. Rep. of Germany . |
| 4006989 | 9/1990 | Fed. Rep. of Germany . |
| 2202104 | 6/1988 | United Kingdom . |

OTHER PUBLICATIONS

Nikon F4 Product Brochure (Dec. 15, 1988).
Canon EOS 10 Product Brochure (Mar. 1990).

Primary Examiner—Mark Hellner
Attorney, Agent, or Firm—Sughrue, Mion, Zinn, Macpeak & Seas

[57] ABSTRACT

A distance measuring apparatus which can accurately measure the distance to an object and keep track of the object. In the apparatus, a pair of image-pickup optical systems pick up an object. A window including the object is set in an image picked up by one of the image-pickup optical systems. The distance to the object is measured by calculating correlation between the image in the window and an image picked up by the other image pickup optical system. Tracking an object is also possible by taking a correlation of images in the window formed in a time sequence. Adequate exposure is determined from an image signal in the window so that the image pickup optical systems are controlled to set the adequate exposure to the image in the window. Contrast of an image in the window becomes distinct, thus enabling accurate distance calculations and tracking of an object.

6 Claims, 11 Drawing Sheets

DISTANCE MEASURING APPARATUS UTILIZING TWO-DIMENSIONAL IMAGE

BACKGROUND OF THE INVENTION:

1. Field of the invention

The present invention relates to a distance measuring apparatus for optically measuring a distance, and, more specifically, to a distance measuring apparatus based on a triangulation system and utilizing a two-dimensional image obtained by an image-pickup apparatus.

2. Description of the Prior Art

Generally, in a distance measuring apparatus based on a triangulation system, which utilizes a two-dimensional image obtained by an image-pickup apparatus, it is essential to adequately determine the level of exposure to which an image-pickup apparatus is subjected for the purpose of accurately measuring a distance to an object, and the level of exposure is determined by an ordinary exposure deciding method for an image pickup apparatus.

Figure 1:
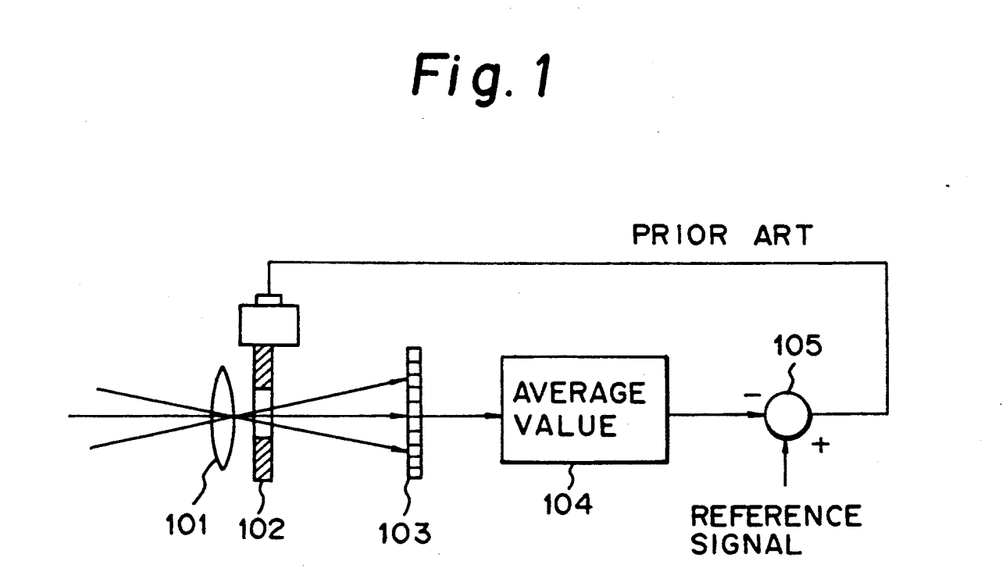
FIG. 1 is a structural diagram of a conventional exposure control apparatus.

FIG. 1 illustrates an exposure control apparatus of a conventional image-pickup apparatus comprising an optical system lens 101, an iris 102, an image sensor 103, a mean value processing circuit 104 and a comparator 105. Image sensor 103 picks up 30 images per second in the case of, for example, a motion picture. Mean value processing circuit 104 obtains a mean value of image signals from image sensor 103. Comparator 105 compares this mean value with a preset reference signal to obtain a deviation which controls an amount of exposure by adjusting iris 102. A mean value of image signals of one picture may be used, but a mean value of image signals of a plurality of successive pictures is usually used.

Figure 2:
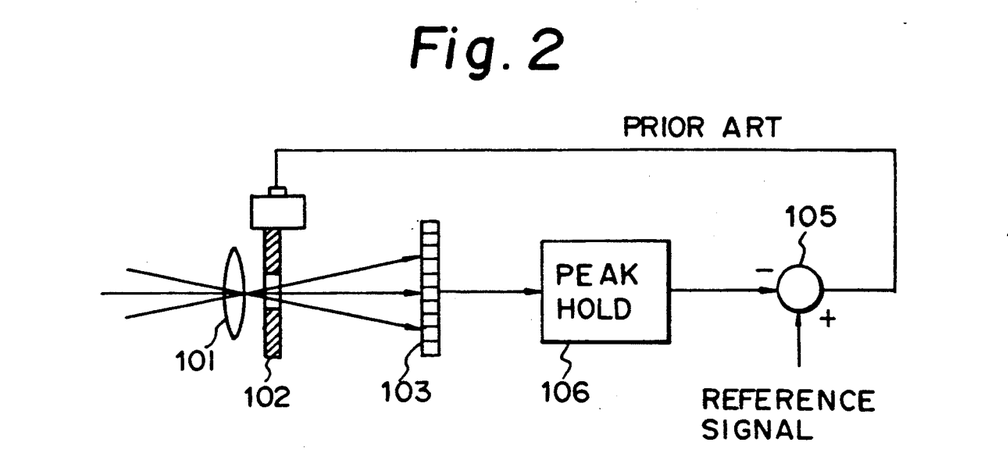
FIG. 2 is a structural diagram of another conventional exposure control apparatus.

FIG. 2 illustrates the structure of another conventional exposure control apparatus. This apparatus is called a peak measuring system which employs a system for deciding a level of exposure from the image signal representing the brightest part of an image.

The control apparatus shown includes a peak hold circuit 106. Image signals from image sensor 103 are inputted to peak hold circuit 106 and the image signal representing the brightest part of an image is held for each picture. Comparator 105 compares the held image signal with a reference signal to obtain a deviation which controls iris 102, thereby controlling an amount of exposure.

Also, a system for deciding an amount of exposure from the brightness of a limited region in the periphery of a picture center and a system for sampling several representative points in a picture to decide the level of exposure from a mean value of the brightness of the sampled points have been proposed.

Conventional distance measuring apparatuses control, as explained above, amounts of exposure of image-pickup apparatuses. However, since an image of a distance measurement object is not always picked up in a clear contrast at an adequate exposure level, an error may be generated in a distance calculation, the resulting distance calculation may not be used for distance determination, and, in a tracking-type distance measuring apparatus, tracking may be impossible or an erroneous object may be tracked.

SUMMARY OF THE INVENTION

It is an object of the present invention to provide a distance measuring apparatus which overcomes such problems as explained above and can accurately measure a distance to an object as well as ensuring accurate tracking of an object.

A distance measuring apparatus of the present invention comprises: a window setting means for setting a window including an object in an image picked up by one of the image-pickup optical systems; a distance calculating means for calculating the distance to the object by calculating a correlation between an image in the window and an image picked up by the other image-pickup optical system; an exposure calculating means for calculating an adequate exposure level of the image-pickup optical systems from an image signal in the window; and a control means for controlling the image-pickup optical systems so that an adequate exposure is set for the image in the window.

The distance measuring apparatus of the present invention further comprises a tracking means for tracking an object by using an image in the window as a reference image to take correlation of the reference images in a time sequence.

When a difference between mean and peak values of an image signal in the window is equal to or larger than a predetermined value, or when a ratio of a region of an image in the window having a brightness equal to or higher than a predetermined value to the remaining region exceeds a predetermined value, an adequate exposure level can be calculated with a peak value of the image signal in the window.

When the headlights of a vehicle are OFF, an adequate exposure level may be calculated from a mean value of an image signal in the window, while the headlights are ON, adequate exposure can be calculated from a peak value of an image signal in the window.

In the present invention, a window including an object is set in an image picked up by one of the image-pickup optical systems so that adequate exposure of the image-pickup optical systems is calculated from an image signal in the window. As a result, an image can be obtained such that the image in the window displays clear contrast, whereby a more accurate correlation between the image in the window and the image picked up by the other optical system can be achieved. In addition, tracking an object is carried out by taking a correlation of the images in the window in time sequence to thereby provide a more accurate correlation.

When a difference between mean and peak values of an image signal in the window is equal to or larger than a predetermined value, or when a ratio of a region of the image in the window having a brightness equal to or higher than a predetermined value to the remaining region exceeds a predetermined value, an adequate exposure level may be obtained by a peak value of the image signal in the window whereby optimum contrast of the image in the window is obtained.

When the headlights of a vehicle are OFF and ON, an adequate exposure level may be calculated by a mean value and a peak value of the image signal in the window, respectively. When the headlights are OFF, in the daytime, and an image is bright, an accurate exposure level may be calculated from a mean value of the image signal. When the headlights are ON at night or in a tunnel, an image is dark, but the tail lamps of a leading vehicle are bright, so that an adequate exposure level may be obtained from a peak value of the image signal.

The above and other objects and features of the present invention will become more apparent from the fol-

Figure 3:
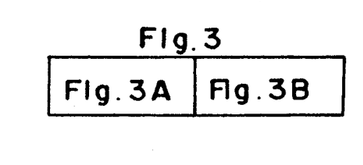
FIG. 3 shows 3a and 3b together.
Figure 3A:
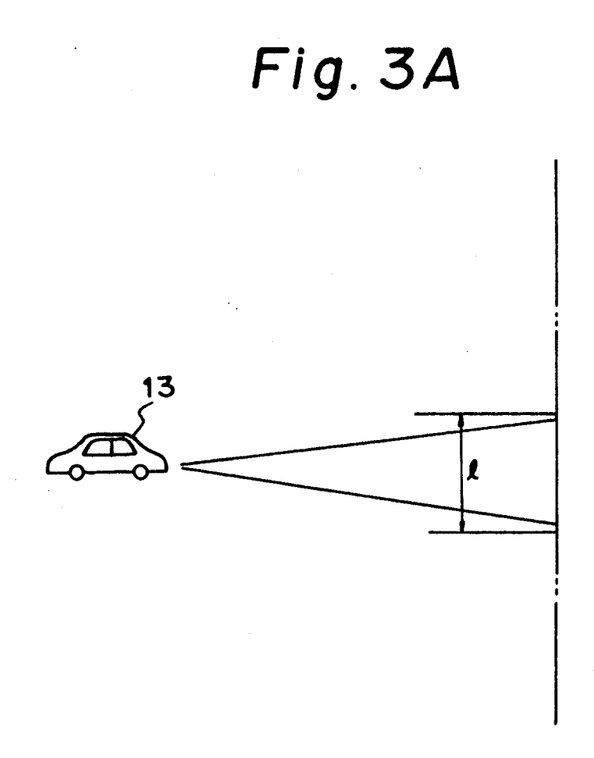
FIGS. 3a and 3b are structural diagrams of a first embodiment of a distance measuring apparatus according to the present invention.
Figure 3B:
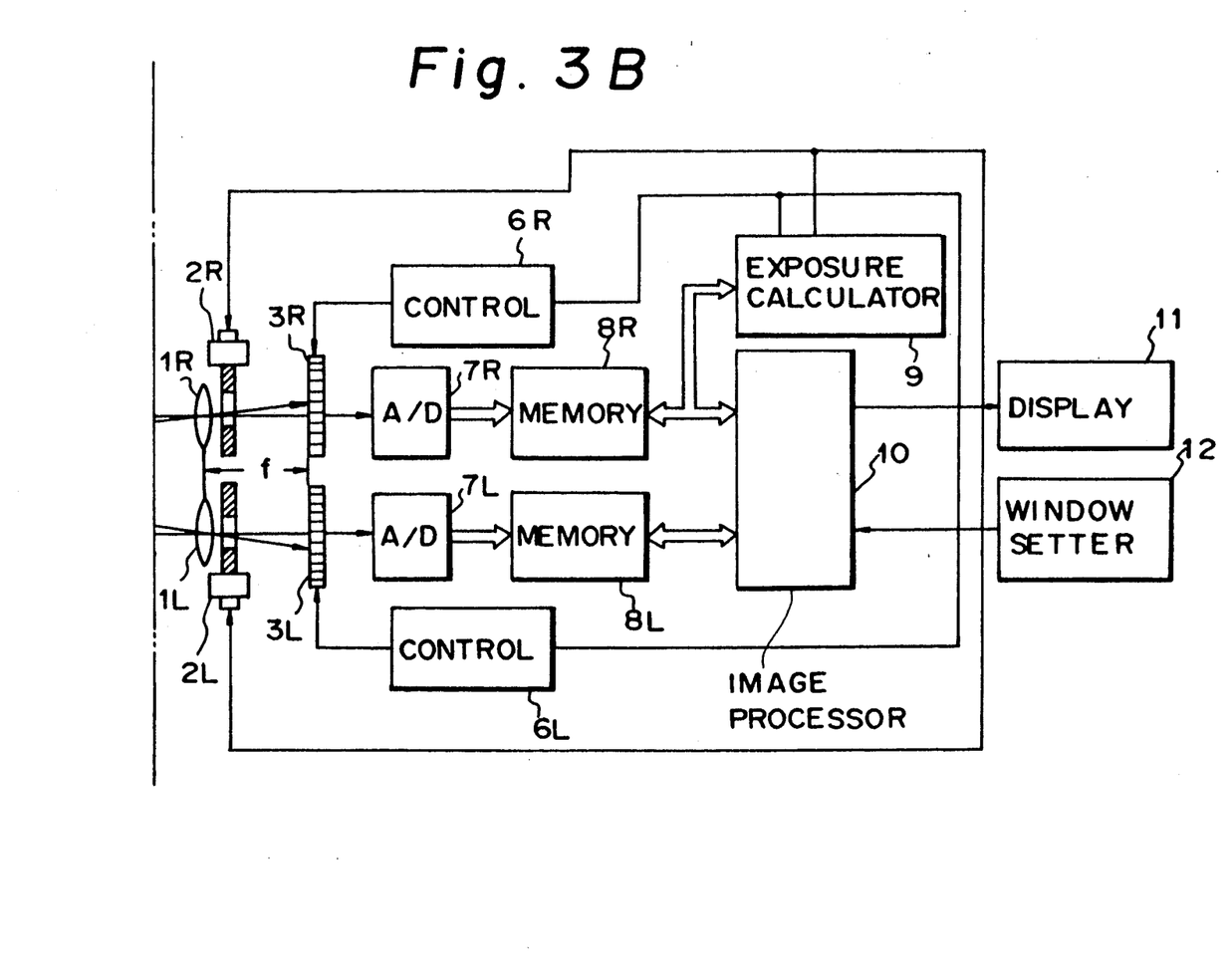

DETAILED DESCRIPTION OF THE PREFERRED EMBODIMENTS:

Embodiments of the present invention will be described with reference to the accompanied drawings. FIGS. 3A and 3B illustrate the structure of the first embodiment of a mobile distance measuring apparatus according to the present invention. This distance measuring apparatus comprises a pair of optical system lenses 1L, 1R for image pickup, a pair of irises 2L, 2R, a pair of image sensors 3L, 3R, a pair of image sensor control circuits 6L, 6R, a pair of analog/digital converters 7L, 7R, a pair of memories 8L, 8R, an exposure calculation circuit 9, an image signal processor 10, an image display 11, and a window setting unit 12. The apparatus operates to measure the distance between a preceding vehicle 13 and the distance measuring apparatus.

Figure 4A:
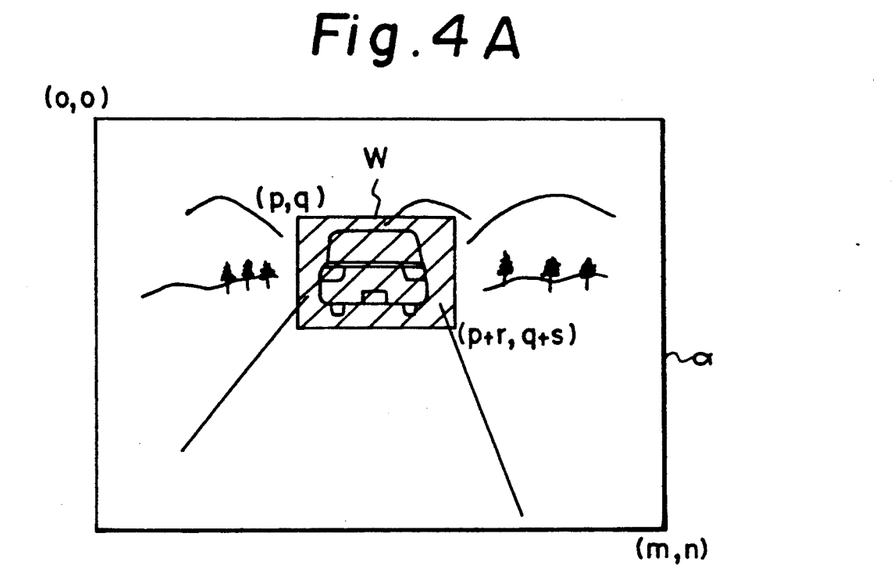
FIGS. 4a and 4b are diagrams for explaining operation of the first embodiment of a distance measuring apparatus of the present invention.
Figure 4B:
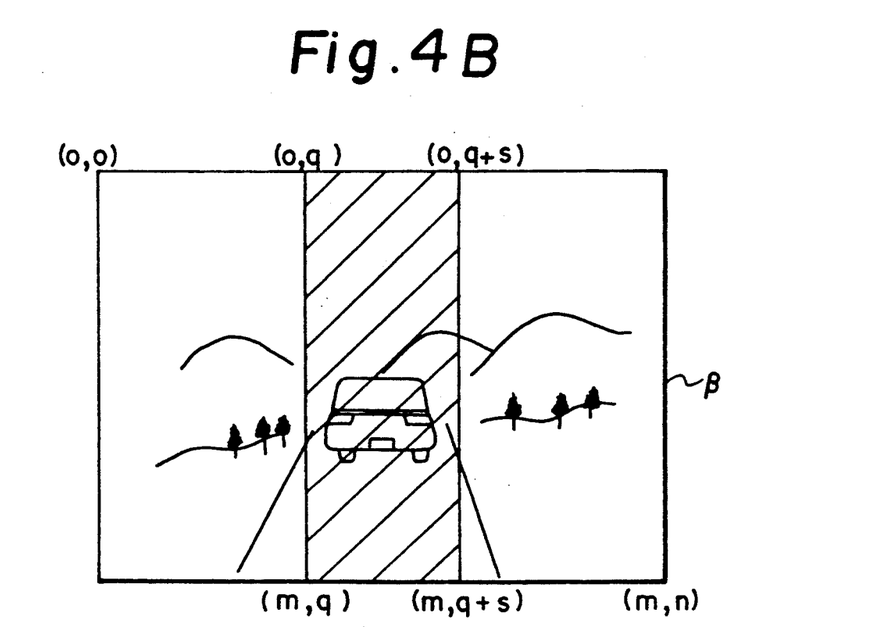

Next, operation of the distance measuring apparatus having the structure, described above will be explained. An image of vehicle 13 is picked up by a pair of image sensors 3L, 3R through a pair of optical system lenses 1L, 1R and a pair of irises 2L, 2R. The image signal thus formed is converted to a digital signal by analog/digital converters 7L, 7R and then stored in a pair of memories 8L, 8R. A window W (FIGS. 4A and 4B), which is set by window setting unit 12, is inputted to image processor 10 and the address of the window is stored in memory 8R. FIGS. 4A and 4B illustrate images $\alpha$ and $\beta$ picked up by image sensors 3R, 3L. The entire picture is formed by pixels arranged in m rows and n columns. Window W is set in a shape defined by the p-th row, qth column, (p+r)th row and (q+s)th column in image $\alpha$ picked up by image sensor 3R, and the entire picture and window W are displayed on image display 11.

In order to obtain the distance between vehicle 13 and a pair of pictures picked up by image sensors 3L, 3R, correlation between an image signal $S_{ij}$ within window W formed in image $\alpha$ picked up by image sensor 3R and an image signal $S'_{ij}$ within a hatched region in image $\beta$ picked up by image sensor 3L is taken to detect from image $\beta$ the portion most closely matching the image in window W. Mathematically, the following calculation is executed:

$$C(x) = \sum_{j=q}^{q+s} \sum_{i=p}^{p+r} |S_{ij} - S_{i+x,j}'| \qquad (1)$$

where, $-p \leq X \leq m - r$. Assuming that $C(x)$ of formula (1) using x as a parameter takes a minimum value when $x = x_0$, the image in window W that best matches the image is defined by points $(p+x_0, q)$, $(p+x_0, q+s)$, $(p+x_0+r, q+s)$, $(p+x_0+r, q)$ in image $\beta$ of image sensor 3L. Therefore, a distance R can be obtained by the following formula (2) from the principle of triangulation:

$$R = fl/p_0 x_0 \qquad (2)$$

where l is a basic line length (the interval between the centers of optical system lenses 1L, 1R), f is the distance between optical system lenses 1L, 1R and image sensors 3L, 3R, and $p_0$ is a pixel pitch in images $\alpha$, $\beta$ picked up by image sensors 3L, 3R.

In order to clearly detect a minimum value of $C(x)$ through such calculations as described above, an image must be distinct. Particularly, it is important that an image in window W is distinct and has sufficient contrast in order to measure distance R. Accordingly an adequate level of exposure is essential. Since a conventional distance measuring apparatus decides exposure of an image in accordance with the entire information of a picture, an image in window W does not always have an adequate exposure level.

In the first embodiment of the present invention, an image signal in window W is read from memory 8R and then input to exposure calculation circuit 9 whereby adequate exposure is calculated based on the brightness of the image in window W. Results of this calculation are inputted to irises 2R, 2L and to image sensors 3R, 3L through image sensor control circuits 6R, 6L in order to control openings of irises 2R, 2L and electronic shutter functions of image sensors 3R, 3L. As a result, an exposure level can be controlled over a wide range and the level of exposure to which an image in window W is subjected adequately.

In a calculation for adequate exposure according to the present invention, it is possible that a mean or peak value of image signals in window W and a representative value at an area near the center of window W may be used. Alternatively, an adequate exposure level can be set more accurately by taking a mean value of image signals in window W in daylight and calculating an exposure level using a peak value of an image signal at night considering that a difference between mean and peak values of an image signal become greater than a predetermined value, since tail lamps of a leading vehicle are particularly bright and the circumference is dark. In the case of rear lights or at an exit of a tunnel, if a difference in brightness is large and a region having a brightness greater than a predetermined value occupies more than a predetermined rate of the image in window W, halation is generated. Therefore, calculating a peak value may be desirable.

Figure 5:
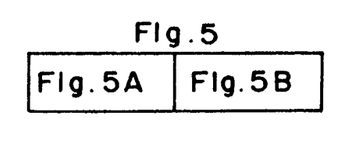
FIG. 5 shows 5a and 5b together.
Figure 5A:
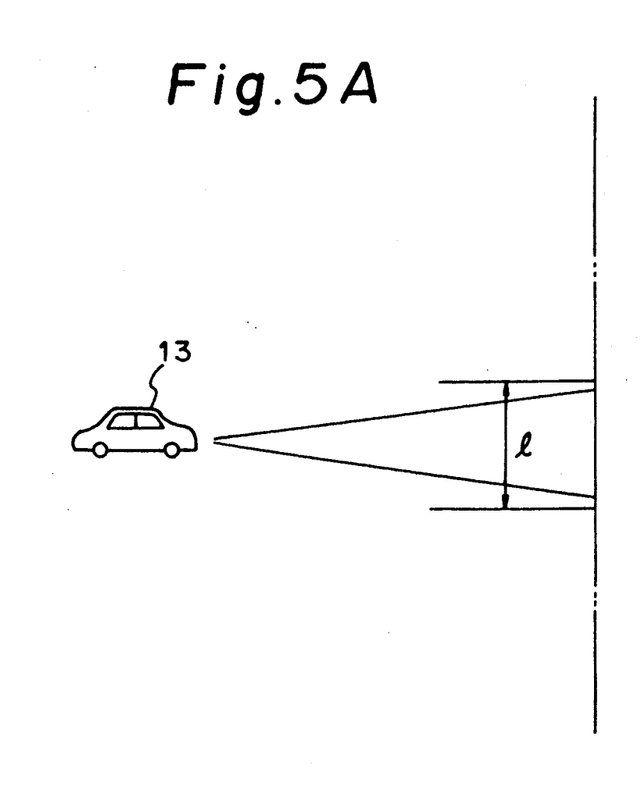
FIGS. 5a and 5b are structural diagrams of a second embodiment of a distance measuring apparatus according to the present invention.
Figure 5B:
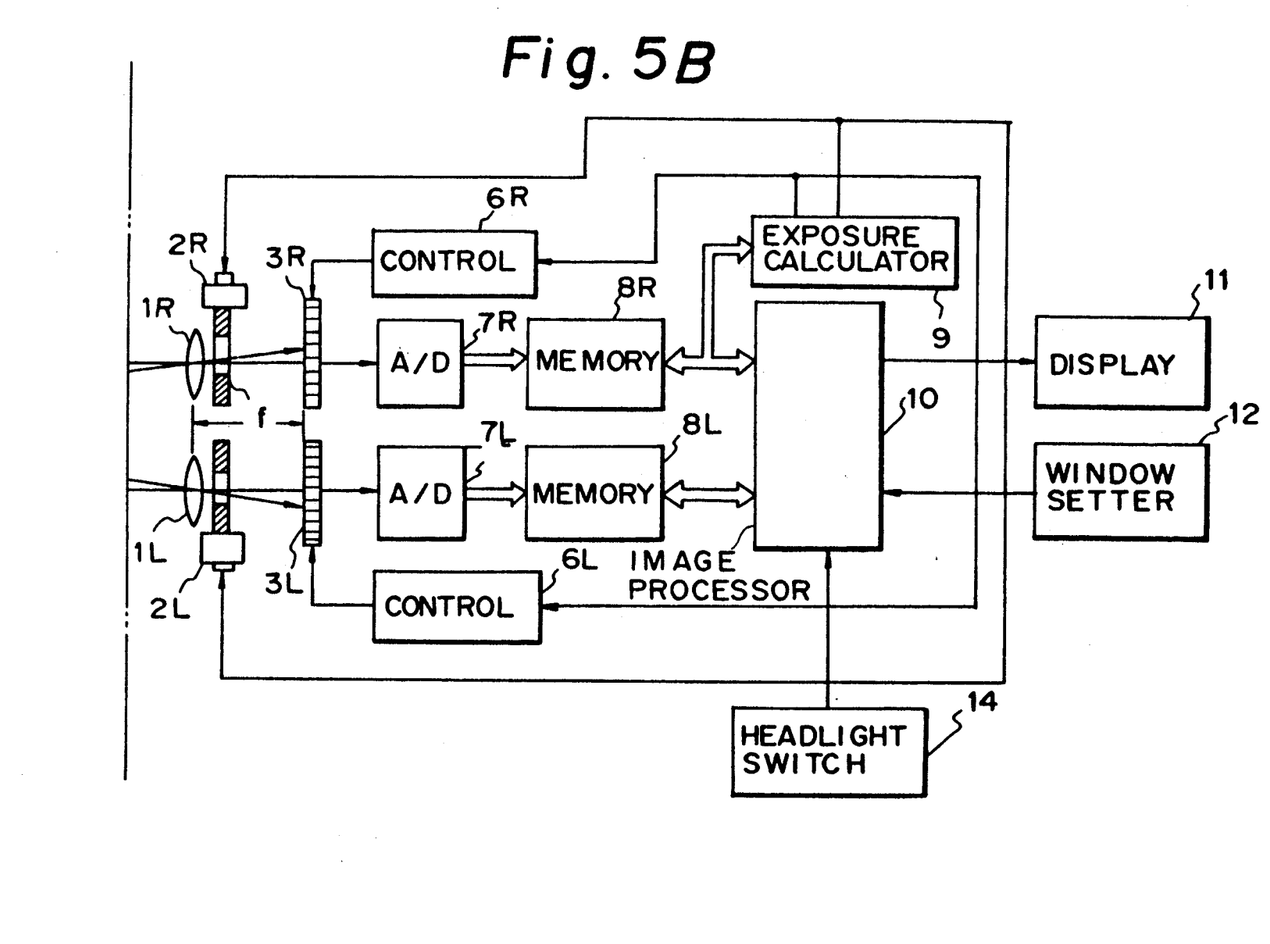

FIGS. 5A and 5B illustrate a second embodiment of a distance measuring apparatus according to the present invention, which is interlocked with a headlight switch 14 of a vehicle. In the daytime, since headlights are usually off, exposure calculation circuit 9 detects that headlight switch 14 is turned OFF and operates to calculate an adequate exposure level with a mean value of the image signals within window W. At night or in a tunnel, headlight switch 14 is turned ON to activate the headlights. Therefore, exposure calculation circuit 9 detects the ON condition of headlight switch 14. During the night, since the tail lamps of vehicle 13 is bright and the circumference is dark, an adequate exposure level is calculated based on a peak value of the image signal within window W for the same reason as the first embodiment.

Figure 6:
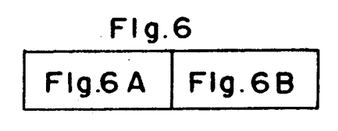
FIG. 6 shows FIGS. 6a and 6b together.
Figure 6A:
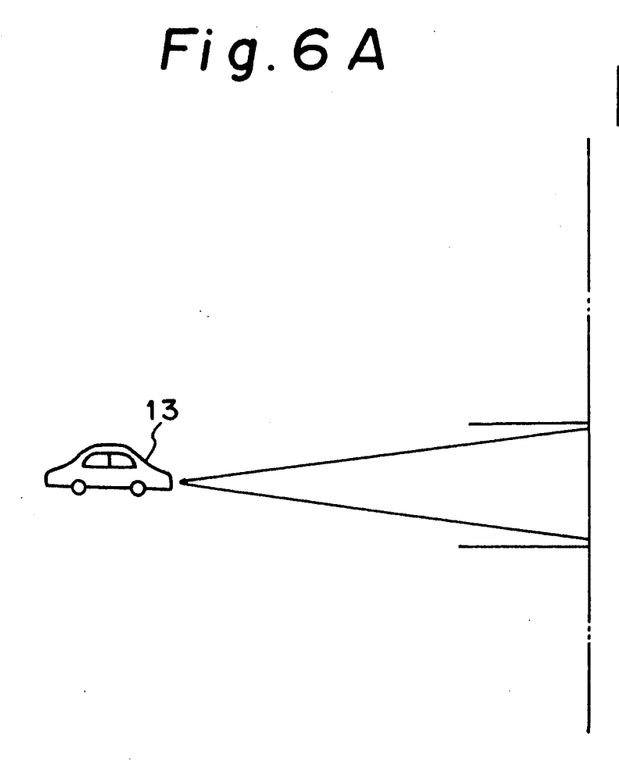
FIGS. 6a and 6b are structural diagrams of a third embodiment of a distance measuring apparatus according to the present invention.
Figure 6B:
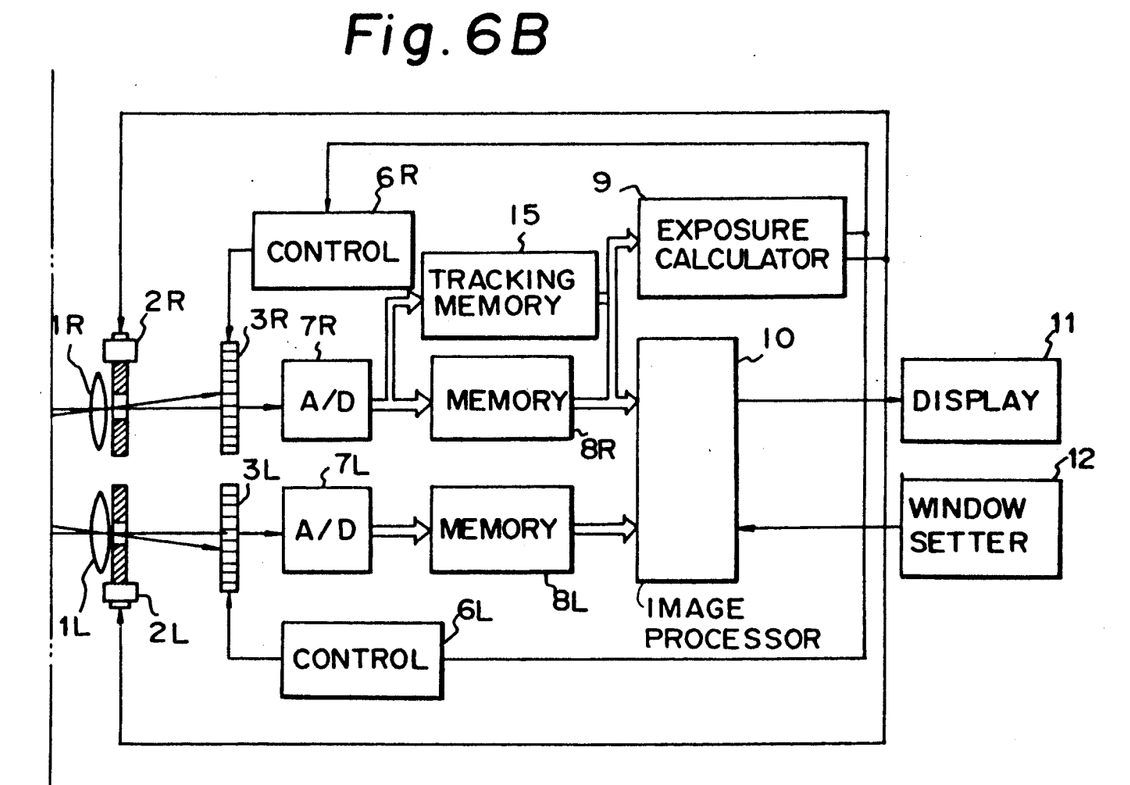
Figure 7:
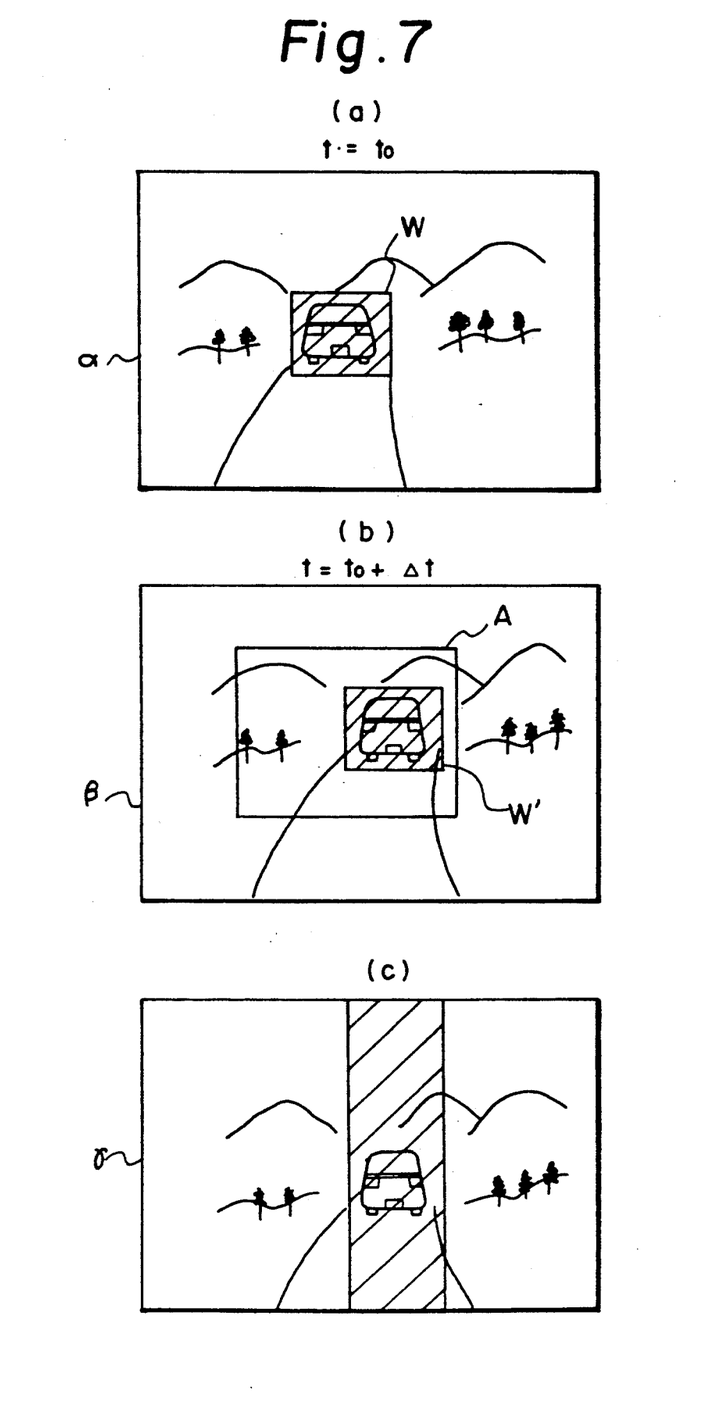
FIGS. 7(a)-7(c) are diagrams for explaining operation of the third embodiment of a distance measuring apparatus of the present invention.

FIGS. 6A and 6B illustrate a third embodiment of a distance measuring apparatus according to the present invention. The distance measuring apparatus of this embodiment comprises a tracking memory 15 and the remaining structure is the same as the apparatus shown in FIG. 3. For tracking vehicle 13, image α picked up by image sensor 3R at a time $t = t_0$ shown in FIG. 7(a) is stored in memory 8R, and window W is set in the same memory. After the distance between vehicle 13 and the apparatus is calculated by the image signals stored in memories 8R, 8L, the signals stored in memory 8R are transferred to memory 15 and stored therein.

As illustrated in FIG. 7(b), images β, γ picked up by image sensors 3R, 3L at a time $t = t_0 + \Delta t$ after a minute time $\Delta t$ has passed from time $t_0$ are stored in memories 8R, 8L. Then the image which best matches the images in window W at times t and $t_0$ stored in memory 15 is detected in image β stored at time $t = t_0 + \Delta t$, and a new window W' is set in memory 8R. After setting new window W', distance R to the vehicle 13 is calculated using image γ stored in memory 8L and window W'. Thereafter, the image signals stored in memory 8R are transferred to memory 15.

The images in window W can be tracked by executing the operations explained above as time passes. The image which matches the image in the window defined by the r-th row, s-th column, p-th row and q-th column set at the time $t = t_0$ is detected in an enlarged region A including window W in the image at time $t = t_0 + \Delta t$. More specifically, the following calculation is executed:

$$C(x,y) = \sum_{j=q}^{q+s} \sum_{i=p}^{p+r} |S_{ij} - S_{i+x, j+y'}| \quad (3)$$

where $p - u \leq x \leq p + r + u$, $q - v \leq y \leq q + s + v$ and adequate values are set to u and v depending on a value of $\Delta t$.

When C(x, y) becomes minimum, the image in enlarged region A suitably matches the image in window W. Window W' at time $t = t_0 + \Delta t$ is defined as the region surrounded by points $(p + x_0, q + y_0)$, $(p + x_0 + r, q + y_0)$, $(p + x_0 + r, q + y_0 + s)$ and $(p + x_0, q + y_0 + s)$ by obtaining parameters $x_0$ and $y_0$ at that time. The distance to vehicle 13 found in window W' can be calculated using the principle of triangulation from a couple of images β, γ at time $t = t_0 + \Delta t$ for new window W'. As explained above, the distance to vehicle 13 can be measured continuously by tracking vehicle 13 within window W initially set.

For the purpose of tracking a vehicle without fail and measuring the distance to the vehicle by way of the calculations explained above, the images in windows W, W' should be particularly distinct. Therefore, the image signals in windows W, W' are inputted to exposure calculation circuit 9 of FIG. 6 to determine adequate exposure, either or both openings of irises 2R, 2L and electronic shutter functions of image sensors 3R, 3L are controlled in accordance with a result of calculation and thereby adequate exposure to the images in windows W, W' can be set.

In calculating an adequate level of exposure, it is desirable that a mean value of the image signals in window W, W' is used in the daytime, but that, at night, a more accurate exposure level may be calculated based on a peak value of the image signals within windows W, W' because the tail lamps of vehicle 13 are bright and the circumference is dark. In the case where a difference in brightness is large, for example, in the case of rear lights or at an exit of a tunnel, halation may be generated. In this case, it is desirable to execute calculations based on a peak value of the image signals within windows W, W'.

Figure 8:
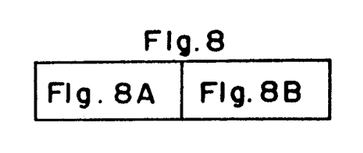
FIG. 8 shows FIGS. 8a and 8b together.
Figure 8A:
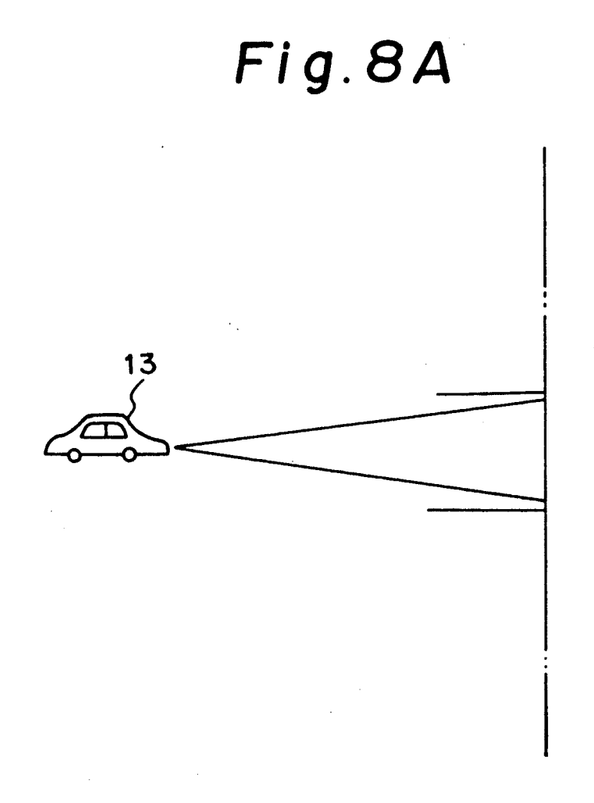
FIGS. 8a and 8b are structural diagrams of a fourth embodiment of a distance measuring apparatus according to the present invention.
Figure 8B:
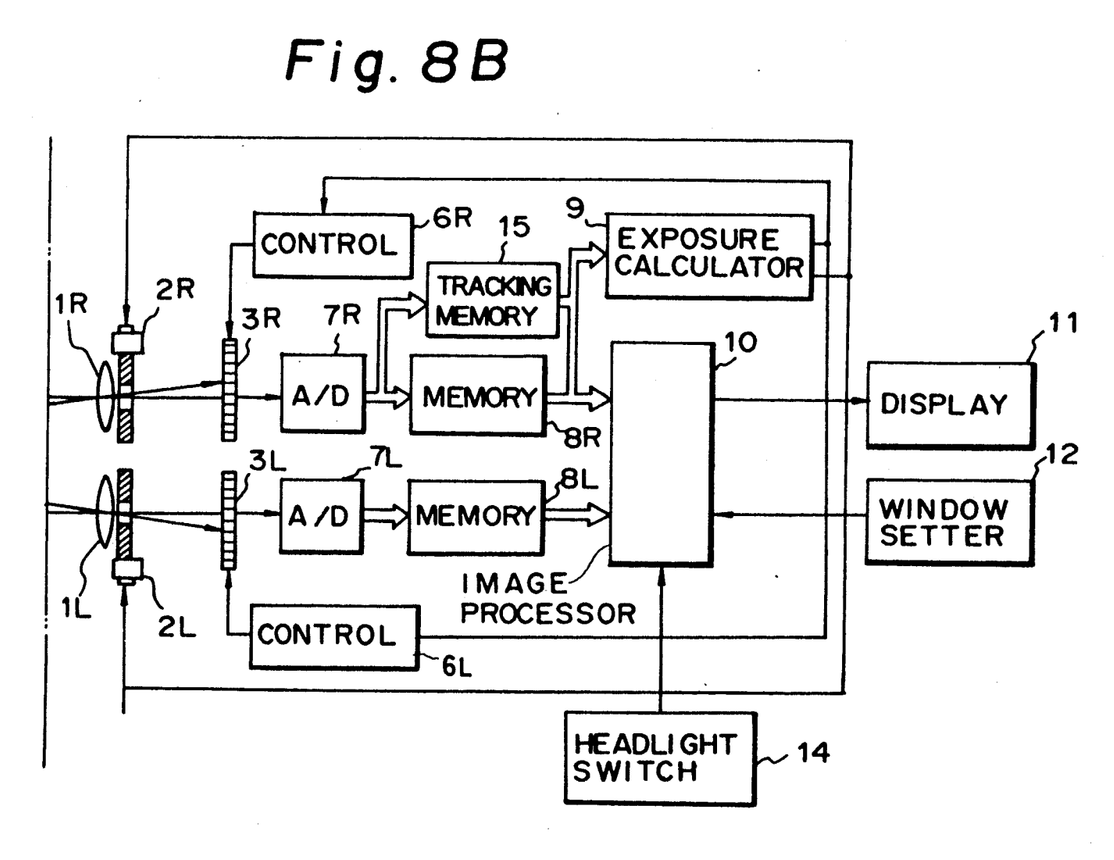

FIGS. 8A and 8B illustrate a fourth embodiment of a distance measuring apparatus according to the present invention, also comprising headlight switch 14 and memory 15 as explained above. Exposure calculation circuit 9 detects that headlight switch 14 is in the OFF condition and calculates an adequate level of exposure using mean values of the image signals within windows W, W'. Since switch 14 is turned ON at night or in a tunnel, exposure calculation circuit 9 detects that the headlights are ON. In this case, the level of exposure is calculated in accordance with a peak value of image signals in windows W, W' taking into consideration that the tail lamps of vehicle 13 are bright, the circumference being dark.

As explained above, according to the present invention, a level of exposure of an image-pickup optical system is controlled on the basis of an image signal in a window. As a result, the image signals in the window become distinct, a distance calculation and a calculation for tracking become more accurate whereby accurate distance measurement and tracking can be realized.

Moreover, according to the present invention, since a state of travel of a vehicle, such as in the daytime, at night, or in a tunnel, is identified from the condition of images in a window or an ON-OFF condition of the headlights and an exposure level is determined from a mean or peak value of the image signals in the window in accordance with such a state identification, the image in the window can be set to be more distinct in accordance with circumferential conditions and a distance measurement and tracking of a vehicle can be realized more accurately.

What is claimed is:

1. A distance measuring apparatus comprising:
   a pair of image-pickup optical systems for picking up an image of an object for output to a display device;
   a window setting means for setting a window on the display including said object within the image picked up by one of said image-pickup optical systems;
   a distance calculating means for calculating a distance to said object by calculating a correlation between the image in the window and an image picked up by the other image-pickup optical system;

an exposure calculating means for calculating an adequate exposure level of said image-pickup systems from the image in the window; and a control means for controlling said image-pickup optical systems so that an adequate level of exposure is set for the image in the window.

2. A distance measuring apparatus comprising:

a pair of image-pickup optical systems for picking up an image of an object for output to a display device;

a window setting means for setting a window on the display including said object within the image picked up by one of said image-pickup optical systems;

a distance calculating means for calculating a distance to said object by calculating a correlation between the image in the window and an image picked up by the other image-pickup optical system;

an exposure calculating means for calculating an adequate exposure level of said image-pickup systems from the image in the window; and a control means for controlling said image-pickup optical systems so that an adequate level of exposure is set for the image in the window, wherein said exposure calculating means calculates an adequate exposure level in accordance with a peak value of the image in the window when a difference between mean and peak values of the image in the window is equal to or larger than a predetermined value or when a ratio of a region of the image in the window having a brightness equal to or higher than a predetermined value to the remaining region exceeds a predetermined value.

3. A distance measuring apparatus comprising:

a pair of image-pickup optical systems for picking up an image of an object for output to a display device;

a window setting means for setting a window on the display including said object within the image picked up by one of said image-pickup optical systems;

a distance calculating means for calculating a distance to said object by calculating a correlation between the image in the window and an image picked up by the other image-pickup optical system;

an exposure calculating means for calculating an adequate exposure level of said image-pickup systems from the image in the window; and a control means for controlling said image-pickup optical systems so that an adequate level of exposure is set for the image in the window, wherein said exposure calculating means calculates an adequate exposure level with a mean value of the image in the window when the headlights of a vehicle carrying said apparatus are OFF, or with a peak value of the image in the window when the headlights are ON.

4. A distance measuring apparatus according to claim 1, further comprising a tracking means for tracking said object by using the image in the window as a reference image to take a correlation of reference images in time sequence.

5. A distance measuring apparatus according to claim 2, further comprising a tracking means for tracking said object by using the image in the window as a reference image to take a correlation of reference images in time sequence.

6. A distance measuring apparatus according to claim 3, further comprising a tracking means for tracking said object by using the image in the window as a reference image to take a correlation of reference images in time sequence.

* * * * *